United States Patent
Larue et al.

(10) Patent No.: US 11,530,935 B2
(45) Date of Patent: Dec. 20, 2022

(54) CRANKSHAFT, TRANSMISSION OR CAMSHAFT SENSOR, DIAGNOSIS SYSTEM AND METHOD IMPLEMENTING SUCH A SENSOR

(71) Applicants: Continental Automotive France S.A.S., Toulouse (FR); Continental Automotive GmbH, Hannover (DE)

(72) Inventors: Marie-Nathalie Larue, Corronsac (FR); Masuo Hannuki, Tokyo (JP); Benjamin Marconato, Villeneuve Tolosane (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 326 days.

(21) Appl. No.: 16/648,032

(22) PCT Filed: Sep. 26, 2018

(86) PCT No.: PCT/EP2018/076076
§ 371 (c)(1),
(2) Date: Mar. 17, 2020

(87) PCT Pub. No.: WO2019/063594
PCT Pub. Date: Apr. 4, 2019

(65) Prior Publication Data
US 2020/0256708 A1    Aug. 13, 2020

(30) Foreign Application Priority Data

Sep. 29, 2017 (FR) .................................. 1759095
Sep. 24, 2018 (FR) .................................. 1858621

(51) Int. Cl.
*G01D 5/24* (2006.01)
*G01D 5/244* (2006.01)
(Continued)

(52) U.S. Cl.
CPC ....... *G01D 5/24457* (2013.01); *F02D 41/009* (2013.01); *G01D 5/2457* (2013.01); *G07C 5/0808* (2013.01)

(58) Field of Classification Search
CPC  G01D 5/24457; G01D 5/2457; F02D 41/009; G07C 5/0808
See application file for complete search history.

(56) References Cited

U.S. PATENT DOCUMENTS 5,685,284 A    11/1997 Nakamichi
10,215,591 B2    2/2019 Mirassou et al.
(Continued)

FOREIGN PATENT DOCUMENTS

CN    101833052 A    9/2010
CN    102915033 A    2/2013
(Continued)

OTHER PUBLICATIONS

Chinese Office Action for Chinese Application No. 201880063347.7, dated Jun. 28, 2021 with Search Report, 7 pages.
(Continued)

*Primary Examiner* — Joseph J Dallo
(74) *Attorney, Agent, or Firm* — RatnerPrestia (57) ABSTRACT

The invention relates to a crankshaft, transmission or camshaft sensor (10) for a motor vehicle, intended for being connected to an engine control unit (30) by a cable (20). The sensor comprises a processing module (17) and a voltage-modifying circuit (18) configured to generate an output signal via an output port (12) of the sensor (10) allowing a diagnosis module (36) of the engine control unit (30) to (Continued)

detect and identify faults of the sensor (10) or the cable (20). In particular, the processing module (17) is configured to provide on its output port (172), when the toothed target (14) is immobile, a predetermined pattern representing the fact that the toothed target (14) is immobile, this predetermined pattern corresponding to a status change of the output port (172) of the processing module (17) with a predetermined time and repeated periodically. The invention likewise relates to a diagnosis system (1) comprising such a sensor (10), a cable (20) and an engine control unit (30). The invention also relates to a diagnosis method (50) implemented by said diagnosis system (1).

11 Claims, 4 Drawing Sheets

(51) Int. Cl.
*F02D 41/00* (2006.01)
*G01D 5/245* (2006.01)
*G07C 5/08* (2006.01)

(56) References Cited

U.S. PATENT DOCUMENTS

| | | | |
|---|---|---|---|
| 2017/0059526 A1* | 3/2017 | Grambichler | ......... G01M 15/06 |
| 2017/0322053 A1 | 11/2017 | Mirassou et al. | |

FOREIGN PATENT DOCUMENTS

| | | | | |
|---|---|---|---|---|
| CN | 103176070 A | 6/2013 | | |
| CN | 103292806 A | 9/2013 | | |
| FR | 3021739 A1 | 12/2015 | | |
| JP | 2006049669 A | 2/2006 | | |
| WO | WO-2006029988 A1 * | 3/2006 | ............. B64C 13/28 |
| WO | WO-2007062441 A1 * | 6/2007 | ............. B21D 55/00 |
| WO | WO-2008096062 A2 * | 8/2008 | ........... H02K 19/103 |
| WO | 2016082933 A1 | 6/2016 | | |
| WO | WO-2018219553 A1 * | 12/2018 | ............ B60L 3/0038 |

OTHER PUBLICATIONS

International Search Report and Written Opinion for International Application No. PCT/EP2018/0760/6, dated Jan. 3, 2019, 9 pages.

* cited by examiner

CRANKSHAFT, TRANSMISSION OR CAMSHAFT SENSOR, DIAGNOSIS SYSTEM AND METHOD IMPLEMENTING SUCH A SENSOR

CROSS REFERENCE TO RELATED APPLICATIONS

This application is the U.S. National Phase Application of PCT International Application No. PCT/EP2018/076076, filed Sep. 26, 2018, which claims priority to French Patent Application No. 1858621, filed Sep. 24, 2018, and French Patent Application No. 1759095, filed Sep. 29, 2017 the contents of such applications being incorporated by reference herein.

FIELD OF THE INVENTION

The present invention belongs to the field of motor vehicle sensors and more particularly concerns a crankshaft, transmission or camshaft sensor. The invention also concerns a system that includes such a sensor and an engine control unit that is connected to said sensor by an electrical cable, and that implements a diagnostic method suitable for detecting and identifying a fault in the sensor or in the cable.

BACKGROUND OF THE INVENTION

A crankshaft sensor is used in a motor vehicle to determine the angular position and/or the rotational speed of the crankshaft of the engine of the motor vehicle.

Figure 1:
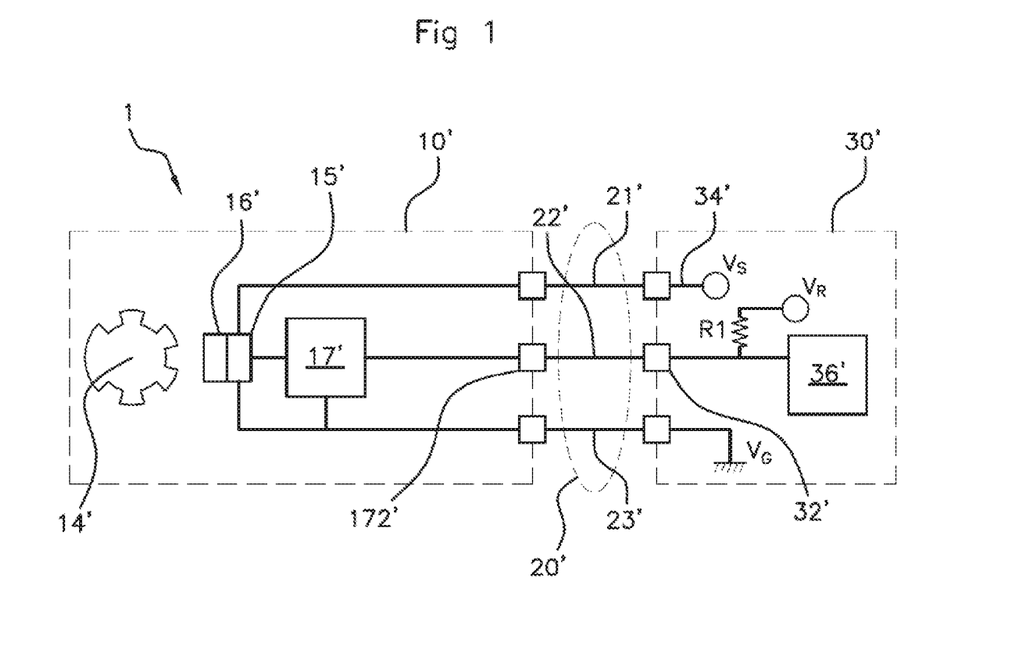
FIG. 1 is a schematic representation of a crankshaft sensor according to the prior art connected to an engine control unit (figure described above)

FIG. 1 schematically shows such a crankshaft sensor 10'. It includes a target 14' mounted on the crankshaft and a measurement cell 15' (for example a Hall effect cell or a magnetoresistive cell) which supplies a raw signal that is representative of the intensity of a magnetic field at said measurement cell 15'. In the example under consideration illustrated in FIG. 1, the magnetic field measured by the measurement cell 15' is formed by a magnetic field generator 16' distinct from the target 14', such as a permanent magnet. According to another example, the magnetic field measured by the measurement cell 15' may be formed by the target 14' itself, which, as the case may be, is composed of a magnetic material.

The target 14' takes the shape of a disk, the periphery of which is toothed. In the case illustrated in FIG. 1, in which the sensor 10' includes a magnetic field generator 16' distinct from the target 14', the target 14' is "geometrically" toothed, i.e. the geometry of the periphery of the target 14' features teeth and gaps. In the case that the magnetic field generator is the target 14' itself, the target 14' is "magnetically" toothed, i.e. the periphery of the target 14' features alternating north poles (regarded hereinafter as similar to teeth) and south poles (regarded hereinafter as similar to gaps).

The teeth of the target 14' are generally of the same height, but may have spacings (gaps) and lengths that are not all identical so as to code the angular position of the target 14'.

The rotation of the target 14' will therefore generate variations in the magnetic field measured by the measurement cell 15', which variations can be analyzed in order to recognize the various teeth of the target 14' and to decode the angular position and/or speed of the target 14' and, ultimately, the angular position and/or speed of the crankshaft rigidly connected to the target 14'.

The sensor 10' also includes a processing module 17' connected to the output of the measurement cell 15'. On the basis of the raw signal delivered by the measurement cell 15', the processing module 17' is capable of placing an output port 172' of the processing module 17' in two distinct states by using, for example, an open-collector logic integrated circuit. For example, when a gap of the target 14' passes in front of the measurement cell 15', an open-collector transistor is turned off and the output port 172' of the processing module 17' is placed in a first, high-impedance state, and when a tooth of the target 14' passes in front of the measurement cell 15', the open-collector transistor is saturated and the output port 172' of the processing module 17' is placed in a second, low state corresponding to a ground potential. If the target 14' is not rotating, the output port 172' of the processing module 17' stays permanently in the first or second state. The transitions between said first state and said second state are therefore representative of the instants in time at which the teeth of the target 14' pass the measurement cell 15'.

The sensor 10' is connected to an engine control unit 30' by an electrical cable 20'. The cable 20' includes a power supply wire 21', a ground wire 23' and a signal wire 22'. An input port 32' of the engine control unit 30' is connected to the output port 172' of the processing module 17' of the sensor 10' by the signal wire 22'. A pull-up resistor R1 connected to a power supply line of the engine control unit 30' allows the voltage observed at the input port 32' of the engine control unit 30' to be changed from a reference potential $V_R$ when the output port 172' of the processing module 17' is in the first, high-impedance state to a ground potential $V_G$ that is substantially equal to 0 V when the output port 172' of the processing module 17' is in the second, low state. Thus, a computer 37' of the engine control unit 30' may decode the angular position and/or the speed of the target 14' (and hence those of the crankshaft) on the basis of a voltage signal observed on the input port 32' of the engine control unit 30'. It should be noted that, in one variant, the resistor R1 may be connected to a power supply line 34' of the sensor 10', in which case the reference potential $V_R$ is equal to the supply potential $V_S$ of the sensor.

However, the system 1' illustrated in FIG. 1 and comprising the crankshaft sensor 10', the cable 20' and the engine control unit 30' is subject to a substantial limitation in that it does not allow a malfunction due to a fault in the sensor 10' or in the cable 20' to be detected.

Moreover, it is advantageous to be able to identify whether a malfunction in the system 1' is due to a fault in the sensor 10' or whether it is due to a fault in the cable 20'. Specifically, in the event of a malfunction in the system 1', and in the absence of a system for assisting in diagnosis, a motor vehicle repairperson will generally be likely to change both the sensor 10' and the cable 20', even though only the cable 20' would need to be changed if it is that which is faulty. Such a situation may thus give rise to unnecessary hardware and labour costs.

It should be noted that the structure and operation of a camshaft sensor or of a transmission sensor of a motor vehicle are very similar to those of the crankshaft sensor 10' illustrated in FIG. 1, and such sensors are subject to the same limitations as those outlined above by way of example for the crankshaft sensor 10'.

Currently, no crankshaft, camshaft or transmission sensor 10' is capable of allowing an engine control unit 30' to detect and to identify a malfunction due to the sensor 10' or to the cable 20' that connects the sensor 10' to the engine control unit 30'.

SUMMARY OF THE INVENTION

The aim of the present invention is to overcome all or some of the drawbacks of the prior art, in particular those outlined above.

To this end, and according to a first aspect, the present invention relates to a crankshaft, transmission or camshaft sensor for a motor vehicle for connection to an engine control unit of the motor vehicle. Said sensor includes a toothed target, a measurement cell suitable for delivering a raw signal that is representative of the variations in a magnetic field that are induced by the rotation of said target, and a processing module suitable for placing an output port of the processing module, according to the raw signal, in a first state or in a second state, the transitions between said first state and said second state being representative of the instants in time at which the teeth of the target pass the measurement cell. The sensor further includes an electronic voltage modifier circuit arranged between the output port of the processing module and an output port of the sensor, said voltage modifier circuit being configured to deliver, over the output port of the sensor, an output signal that is equal to a potential $V_H$ when the output port of the processing module is in the first state, and to a potential $V_L$ when the output port of the processing module is in the second state, said potentials $V_H$ and $V_L$ differing from one another and differing from a supply potential $V_S$ of the sensor and from a ground potential $V_G$.

Such arrangements make it possible in particular to distinguish between cases of normal operation for which the output signal takes the value $V_H$ or $V_L$, and cases of malfunction for which the output signal takes the value $V_S$ or $V_G$. Additionally, it is possible to categorize, or even, in some cases, to identify, faults in the sensor or in the cable that connects said sensor to the engine control unit.

In some particular embodiments, the invention may furthermore comprise one or more of the following features, taken alone or in any technically feasible combination.

In some particular embodiments, the processing module is further configured to deliver, over the output port of said processing module, when the toothed target is immobile, a predetermined pattern that is representative of the fact that the toothed target is immobile.

Such arrangements make it possible to improve the detection and the identification of a potential fault in the sensor or in the cable that connects the sensor to the engine control unit. This makes it possible in particular to distinguish between the normal cases for which the target is immobile and some cases of malfunction.

In some particular embodiments, the predetermined pattern corresponds to a change of state of the output port of the processing module with a predetermined duration and repeated periodically.

In some particular embodiments, the voltage modifier circuit includes a resistor placed between a power supply port of the sensor and the output port of the sensor, a resistor placed between the output port of the processing module and the output port of the sensor, and a resistor placed between a ground port of the sensor and the output port of the sensor.

In some particular embodiments, the voltage modifier circuit includes only passive discrete electronic components.

With such arrangements, the voltage modifier circuit is easy to produce and inexpensive.

According to a second aspect, the present invention relates to a diagnostic system including:
a sensor according to any one of the preceding embodiments;
an electrical cable including a power supply wire, a ground wire and a signal wire;
an engine control unit connected to said sensor by said cable and including:

a power supply port connected to a power supply port of the sensor by the power supply wire;
a ground port connected to a ground port of the sensor by the ground wire;
an input port connected to the output port of the sensor by the signal wire;
a diagnostic module connected to said input port, said diagnostic module being configured to detect and to identify, according to a signal observed on the input port of the engine control unit, a fault in the sensor or a fault in the cable.

In some particular embodiments, the input port of the engine control unit is also connected to a pull-down resistor which is connected to a ground line of the engine control unit.

According to a third aspect, the present invention relates to a motor vehicle including a system according to any one of the preceding embodiments.

According to a fourth aspect, the present invention relates to a diagnostic method implemented by a system according to any one of the preceding embodiments and including:
a recurring step of the diagnostic module retrieving values taken by the signal observed on the input port of the engine control unit;
a step of the diagnostic module comparing the values taken by said observed signal with respect to predefined expected values;
a step of the diagnostic module detecting and identifying, according to the differences between the values taken by said observed signal and the predefined expected values, a fault in the sensor or a fault in the cable.

BRIEF DESCRIPTION OF THE DRAWINGS

Aspects of the invention will be better understood upon reading the following description, given by way of entirely non-limiting example and with reference to FIGS. 1 to 7, in which.

In these figures, references that are identical from one figure to the next denote identical or analogous elements. For the sake of clarity, the elements shown are not to scale, unless indicated otherwise.

DETAILED DESCRIPTION OF THE PREFERRED EMBODIMENTS

Throughout the remainder of the description, reference is made by way of example and without limitation to the case of crankshaft sensor 10 of a motor vehicle. It should however be noted that an aspect of the invention is also suitable for other types of sensors which operates in a similar manner to a crankshaft sensor, such as for example a transmission sensor or a camshaft sensor. More generally still, an aspect of the invention could also be applied to other sensors which do not belong to the field of motor vehicles.

Cases of use are also assumed in which it is considered that the sensor 10 is meant to be active; in other words, normal cases in which the sensor 10 is intentionally not supplied with electricity by the engine control unit 30 are not of interest.

Throughout the remainder of the description, the term "open circuit" for an electrical element is understood to mean that a portion of this element is connected to no other electrical element, and hence that no current flows through this element. The term "short circuit" for one element with respect to another is understood to mean that the two elements have been accidentally connected to one another by a low-resistance conductor, such as for example an electrical wire.

Figure 2:
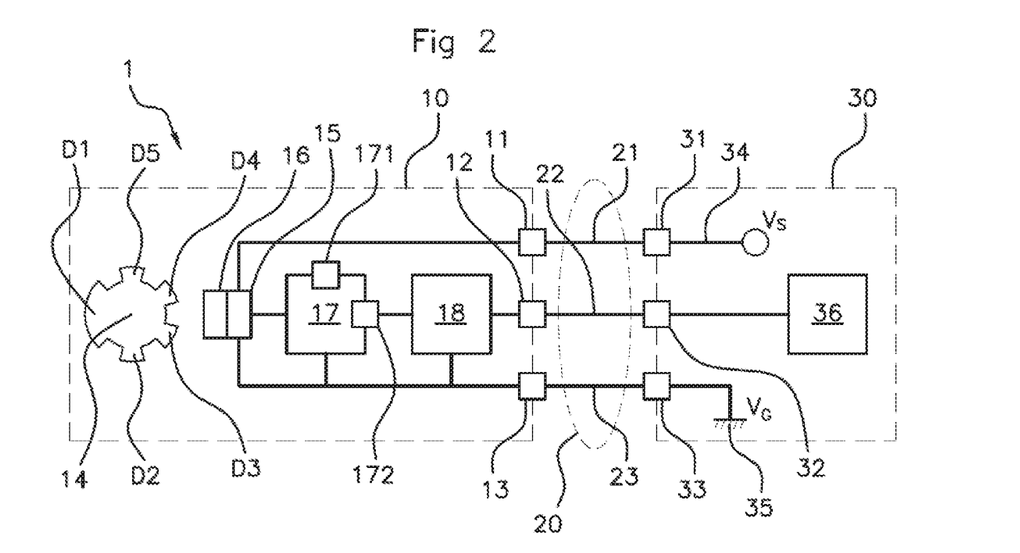
FIG. 2 is a schematic representation of a diagnostic system according to an aspect of the invention.

FIG. 2 shows a diagnostic system 1 according to an aspect of the invention comprising a crankshaft sensor 10, an electrical cable 20, and an engine control unit 30 that is connected to the sensor 10 by the cable 20.

The sensor 10 includes a target 14 mounted on the crankshaft and a measurement cell 15 (for example a Hall effect cell or a magnetoresistive cell) which supplies a raw signal that is representative of the intensity of a magnetic field at said measurement cell 15. In the example under consideration illustrated in FIG. 1, the magnetic field measured by the measurement cell 15 is formed by a magnetic field generator 16 distinct from the target 14, such as a permanent magnet. The target 14 is therefore "geometrically" toothed, and takes the shape of a disk, the periphery of which includes a plurality of teeth D1, D2, D3, D4, D5, which are assumed, without limitation, to be all of the same height. In the example illustrated by FIG. 1, the target 14 includes five teeth D1 to D5 which are not all identical in length. More particularly, the teeth D2, D3, D4 and D5 are of the same length, while the tooth D1 is of a different length, longer than the teeth D2, D3, D4, D5. In the example shown, the spacing between the teeth, i.e. the length of the gaps, is the same for all of the teeth D1 to D5.

However, there is nothing to rule out, according to other examples, having a magnetic field generated by the target 14 which, as the case may be, is "magnetically" toothed, i.e. the periphery of said target features alternating north poles (regarded as similar to teeth) and south poles (regarded as similar to gaps).

Conventionally, the magnetic field generated by the generator 16 is modified by the rotation of the target 14, which is rigidly connected to the crankshaft, and the measurement cell 15 delivers an analog signal, referred to as a "raw signal", which is representative of the variations in the magnetic field that are induced by the rotation of the target 14.

The sensor 10 further includes three ports: a power supply port 11, a ground port 13 and an output port 12, as well as a processing module 17. Conventionally, on the basis of the raw signal delivered, the processing module 17 is capable of placing an output port 172 of the processing module 17 in a first state or in a second state by using for example an open-collector logic integrated circuit, the transitions between said first state and said second state being representative of the instants in time at which the teeth of the target 14 pass the measurement cell 15. The processing module 17 includes for example programmable logic circuits, e.g. FPGAs, PLDs, etc., and/or specialized integrated circuits (ASICs) that are suitable for implementing all or some of the operations required to place the output port 172 of the processing module 17 in the appropriate state according to the raw signal delivered by the measurement cell 15. The processing module 17 further includes a power supply port 171 that is connected to the power supply port 11 of the sensor.

Advantageously, the sensor 10 further includes an electronic voltage modifier circuit 18 that is arranged between the output port 172 of the processing module 17 and the output port 12 of the sensor. This voltage modifier circuit 18 is configured to deliver, over the output port 12 of the sensor 10, an output signal that is equal to a potential $V_H$ when the output port 172 of the processing module is in the first state, and to a potential $V_L$ when the output port 172 of the processing module 17 is in the second state, said potentials $V_H$ and $V_L$ differing from one another and differing from a supply potential $V_S$ of the sensor 10 and from a ground potential $V_G$.

It should be noted that, throughout the description, the expression "a signal equal to $V_{ref}$" is understood to mean that the signal takes a value that is substantially equal $V_{ref}$, for example with a margin of error of 5%.

The electrical cable 20 includes three wires, namely a power supply wire 21, a ground wire 23 and a signal wire 22.

The engine control unit 30 includes three ports:
- a power supply port 31 connected both to a power supply line 34 delivering for example a DC voltage at a potential $V_S$ equal to 5 V, and to the power supply port 11 of the sensor 10 by the power supply wire 21;
- a ground port 33 connected both to a ground line 35 set to a potential $V_G$ that is substantially equal to 0 V, and to the ground port 13 of the sensor 10 by the ground wire 23;
- an input port 32 connected to the output port 12 of the sensor 10 by the signal wire 22.

The engine control unit 30 also includes a diagnostic module 36 connected to the input port 32 of the engine control unit 30 and configured to detect and to identify, according to a signal observed on the input port 32, a fault in the sensor 10 or a fault in the electrical cable 20. In a conventional manner, the diagnostic module 36 includes a set of means, which are considered to be known to a person skilled in the art, for processing the signal (analog filter, amplifier, analog-to-digital converter, sampler, etc.), and a processor and an electronic memory in which a computer program product is stored in the form of a set of program code instructions to be executed in order to implement a diagnostic method 50 that makes it possible to detect and to identify, on the basis of the signal observed at the input port 32 of the engine control unit 30, a fault in the sensor 10 or a fault in the cable 20. In one variant, the diagnostic module 36 alternatively or additionally includes one or more programmable logic circuits, e.g. FPGAs, PLDs, etc., and/or one or more specialized integrated circuits (ASICs) suitable for implementing all or some of the operations required to implement the diagnostic method 50.

In other words, the diagnostic module 36 includes a set of means that are configured as software (specific computer program product) and/or as hardware (FPGA, PLD, ASIC, etc.) in order to implement the diagnostic method 50 on the basis of the signal observed on the input port 32 of the engine control unit 30.

The diagnostic module 36 may be incorporated within the computer 37' of the engine control unit 30 described with reference to FIG. 1. However, there is nothing to rule out the diagnostic module 36 being a module of the engine control unit 30 that is distinct from the computer 37'. The computer 37' is not shown in FIG. 2 in order to simplify the figure.

Figure 3:
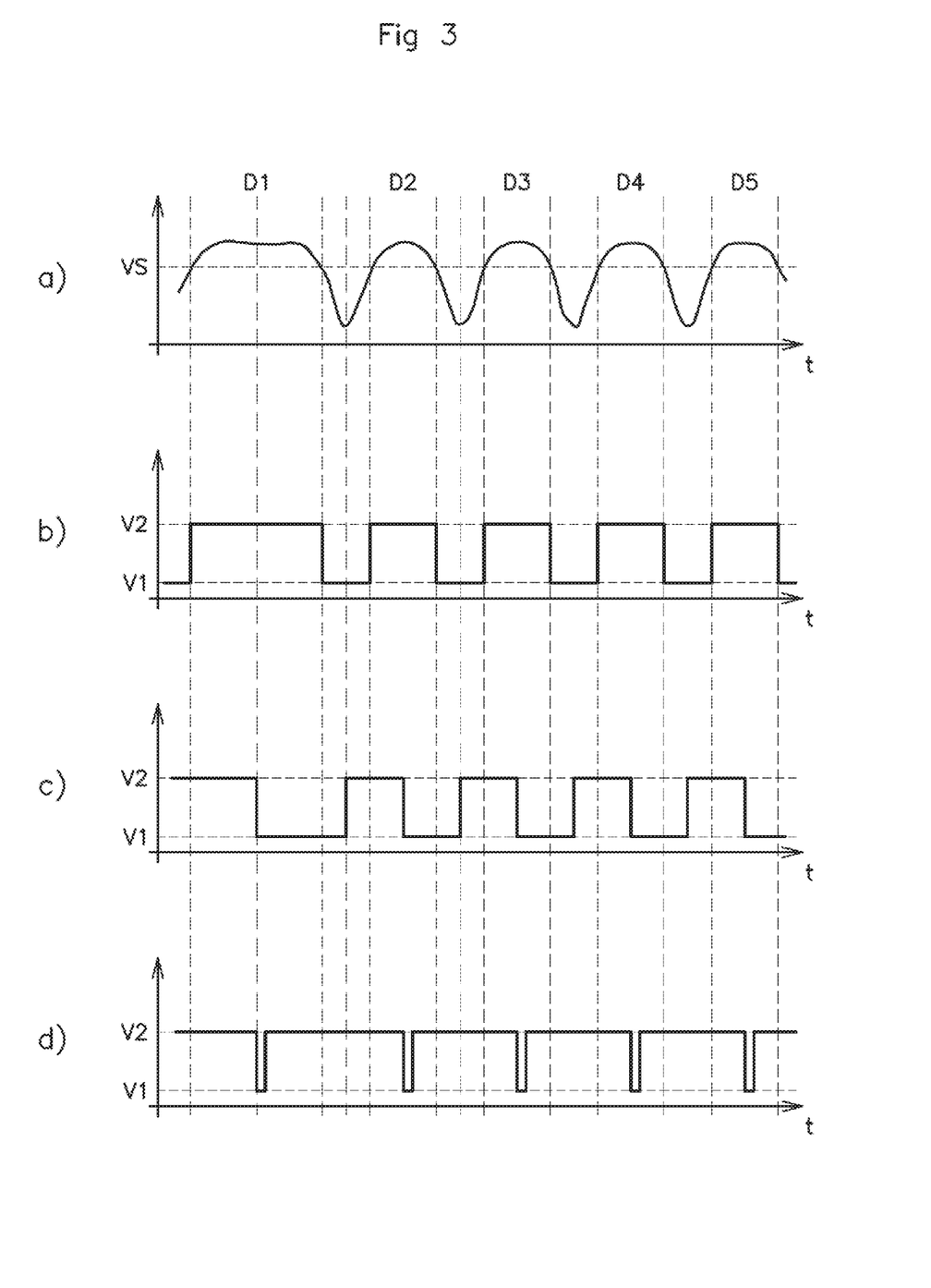
FIG. 3 shows diagrams representing, in part a), a raw signal delivered by a measurement cell of a crankshaft sensor and, in parts b), c) and d), examples of signals observed at an input port of an engine control unit.

Part a) of FIG. 3 shows an example of a raw signal delivered by the measurement cell 15 which is representative of the variations in the magnetic field that are induced by the rotation of the target 14 of the sensor 10. It is observed that the raw signal includes an alternation of local maxima corresponding to the instants in time at which the measurement cell 15 is facing the teeth D1 to D5 and local minima corresponding to the instants in time at which the measurement cell 15 is facing the gaps separating the teeth D1 to D5. The raw signal dwells on a local maximum for longer when the tooth D1 passes in front of the cell 15, because the tooth D1 is longer than the other teeth D2 to D5.

Parts b), c) and d) schematically represent examples of signals that may be observed at the input port 32 of the engine control unit 30.

In the example described by part b) of FIG. 3, when the raw signal is higher than a predefined threshold $V_S$ (which corresponds to a tooth D1 to D5 passing in front of the measurement cell 15), the open-collector transistor of the processing module 17 of the sensor 10 is turned off, and the output port 172 of the processing module 17 is thus placed in a first, high-impedance state. When the raw signal is lower than the threshold $V_S$ (which corresponds to the passage of a gap), the open-collector transistor of the processing module 17 of the sensor 10 is saturated, and the output port 172 of the processing module 17 is placed in a second, low state corresponding to the ground potential $V_G$.

Considering the system 1' of the prior art described with reference to FIG. 1, the signal observed at the input port 32' of the engine control unit 30' then transitions from a potential $V_1=V_R$ when the measurement cell 15' is facing a tooth D1 to D5 to a potential $V_2=V_G$ when the measurement cell 15' is facing a gap.

Considering the system 1 according to an aspect of the invention described with reference to FIG. 2, by virtue of the voltage modifier circuit 18 which will be described below, the signal observed at the input port 32 of the engine control unit 30 then transitions from a potential $V_1=V_H$ when the measurement cell 15 is facing a tooth D1 to D5 to a potential $V_2=V_L$ when the measurement cell 15 is facing a gap, $V_H$ and $V_L$ differing from one another and differing from the potentials $V_S$ and $V_G$.

When the target 14 is immobile, the signal is continuously at the potential $V_1$ when the measurement cell 15 is facing a tooth D1 to D5, or at the potential $V_2$ when the measurement cell 15 is facing a gap.

Part c) of FIG. 3 shows another example in which the signal observed at the input port 32 of the engine control unit 30 is simply offset with respect to the signal described in part b) of FIG. 3, such that the transitions from the potential $V_1$ to the potential $V_2$ take place at the instants in time at which the measurement cell 15 is located facing the middle of a tooth D1 to D5 or of a gap.

Part d) of FIG. 3 shows another example in which the signal observed at the input port 32 of the engine control unit 30 is at the potential $V_2$ for most of the time and transitions to the potential $V_1$ only for a brief pulse each time the measurement cell 15 is located facing the middle of a tooth D1 to D5. The duration of the pulse is for example 45 µs. When the target 14 is immobile, the signal is, in this case, continually at the potential $V_2$.

These examples of signals that are representative of the teeth D1 to D5 of the target 14 passing in front of the measurement cell 15 are known to a person skilled in the art. In particular, a signal of the type shown in part d) of FIG. 3 is particularly suitable for a crankshaft sensor comprising detection of the direction of rotation because the durations chosen for the pulses may also be representative of the direction of rotation of the target 14.

The signals thus correspond to a temporal representation of the position of the target 14 with respect to the measurement cell 15. It is therefore understood that a computer 37' may, on the basis of the signal observed at the input port 32 of the engine control unit 30, distinguish between the various teeth D1 to D5 of the target 14 and deduce therefrom an angular position and/or a speed of rotation of the target 14 and hence of the crankshaft.

However, the system 1' of the prior art described with reference to FIG. 1 does not allow a malfunction due to the sensor 10' or to the cable 20' to be detected. Specifically, in the case of a fault in one or the other of these two elements, for example instances of a short circuit or of an open circuit for one of the wires 21', 22', 23' of the cable 20' or for the processing module 17', the signal observed at the input port 32' of the engine control unit 30' will be continuously at the supply potential $V_R$ or at the ground potential $V_G$. Since such a signal is also representative of a normal case of operation in which the target 14' is not rotating, it is impossible to detect a fault in the sensor 10' or in the cable 20'.

Conversely, the system 1 according to an aspect of the invention, described with reference to FIG. 2, makes it possible to detect and to identify faults in the sensor 10 or in the cable 20 by virtue of the voltage modifier circuit 18.

Specifically, in the normal cases of operation of the system 1, the signal observed at the input port 32 of the engine control unit 30 takes values that are equal to $V_H$ or $V_L$. Conversely, if the signal observed at the input port 32 of the engine control unit 30 take values other than $V_H$ or $V_L$, in particular the values $V_S$ or $V_G$, this is indicative of instances of faults in the sensor 10 or in the cable 20. It is thus possible to detect a malfunction due to the sensor 10 or to the cable 20. Additionally, it is possible to categorize, or even, in some cases, to identify, the type of fault.

Throughout the remainder of the description, unless stated otherwise, the case in which the signal observed at the input port 32 of the engine control unit 30 is of the type illustrated by part d) of FIG. 3 is used by way of example and without limitation. In other words, in the normal cases of operation, the signal observed at the input port 32 of the engine control unit 30 transitions briefly to the value $V_L$ each time a tooth D1 to D5 passes by and remains at the potential $V_H$ for the rest of the time.

Figure 4:
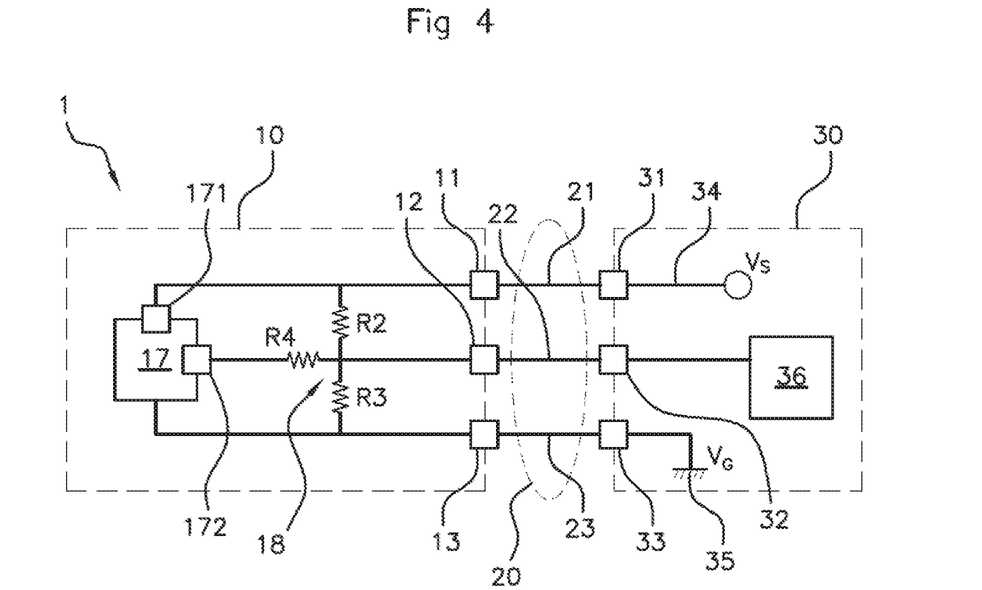
FIG. 4 is a detailed schematic representation of one particular embodiment of a diagnostic method according to an aspect of the invention.

FIG. 4 is a schematic representation of one particular embodiment of a diagnostic system according to an aspect of the invention showing the voltage modifier circuit 18 in detail. In this figure, the target 14, the measurement cell 15 and the magnetic field generator 16 are intentionally not shown in order to simplify the figure.

In this particular embodiment, the voltage modifier circuit 18 includes a resistor R2 placed between the power supply port 11 of the sensor 10 and the output port 12 of the sensor 10, a resistor R3 placed between the ground port 13 of the sensor 10 and the output port 12 of the sensor 10, and a resistor R4 placed between the output port 172 of the processing module 17 and the output port 12 of the sensor 10.

In the example under consideration illustrated in FIG. 4, the resistor R2 has a value of 1 kΩ, the resistor R3 has a value of 5.1 kΩ and the resistor R4 has a value of 200Ω. Thus, when the output port 172 of the processing module 17 is placed in the first, high-impedance state (corresponding to the case in which the open-collector transistor of the processing module 17 of the sensor 10 is turned off), a voltage divider bridge is formed by the resistors R2 and R3. The signal observed at the input port 32 of the engine control unit 30 then takes the value:

$$V_H = \frac{R3}{R2 + R3} \cdot V_S$$

When the output port 172 of the processing module 17 is placed in the second state (low state corresponding to the case in which the open-collector transistor of the processing module 17 is saturated), a voltage divider bridge is formed by the resistor R2 on one side and by the resistors R3 and R4 connected in parallel on the other side. The signal observed at the input port 32 of the engine control unit 30 then takes the value:

$$V_L = \frac{\frac{R3 \cdot R4}{R3 + R4}}{R2 + \frac{R3 \cdot R4}{R3 + R4}} \cdot V_S$$

With the values mentioned above for the resistors R2, R3 and R4, $V_H$ then takes a value close to 84% of $V_S$ and $V_L$ takes a value close to 16% of $V_S$.

The voltage modifier circuit 18 described in FIG. 4 uses only discrete passive components, and is therefore easy to produce and inexpensive.

Figure 5:
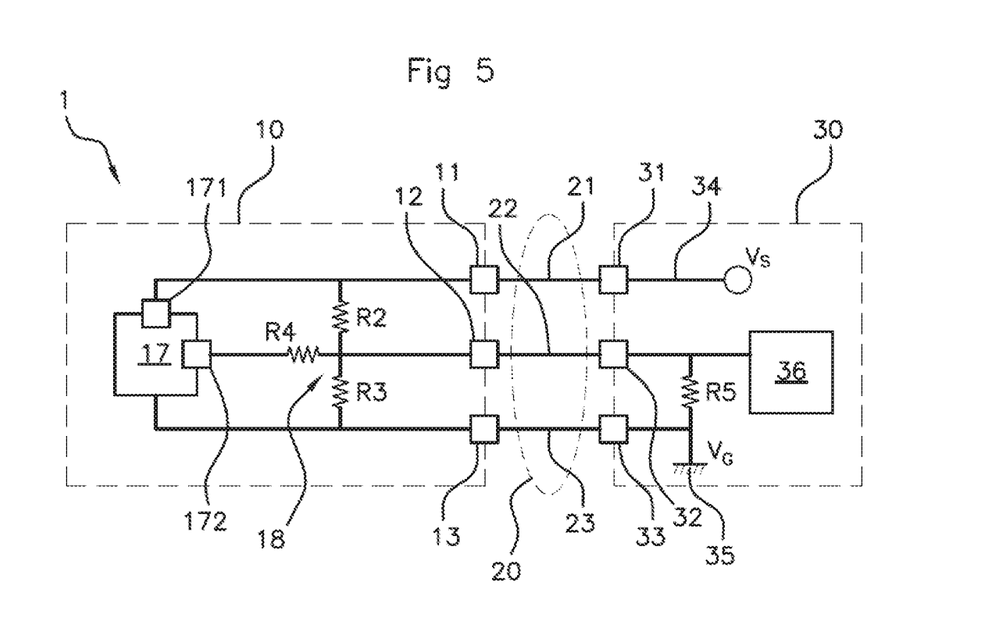
FIG. 5 is a detailed schematic representation of a preferred embodiment of a diagnostic system according to an aspect of the invention.

FIG. 5 is a schematic representation of a preferred embodiment of a diagnostic system according to an aspect of the invention. It corresponds to the embodiment described with reference to FIG. 4 and for which a pull-down resistor R5 is additionally placed between the input port 32 of the engine control unit 30 and the ground line 35. This pull-down resistor R5 makes it possible in particular to place the input port 32 of the engine control unit 30 in a determined state that is equal to the ground potential $V_G$ in the case of an open circuit of the signal wire 22. In the example under consideration illustrated in FIG. 5, the resistor R5 has a value of 51 kΩ, such that it only very slightly affects the values of $V_H$ and $V_L$.

It is then possible, on the basis of the signal observed at the input port 32 of the engine control unit 30, to categorize, or even, in some cases, to identify, the type of fault.

For example, if the signal observed at the input port 32 of the engine control unit 30 is continuously equal to $V_G$, the malfunction is most probably due to one of the following faults:

open circuit of the power supply wire 21;
open circuit of the signal wire 22;
short circuit of the signal wire 22 with the ground wire 23;
short circuit of the power supply wire 21 with the ground wire 23;
short circuit of the power supply port 171 of the processing module 17 with the ground wire 23.

If the signal observed at the input port 32 of the engine control unit 30 is continuously equal to $V_S$, the malfunction is most probably due to one of the following faults:

short circuit of the power supply wire 21 with the signal wire 22;
open circuit of the ground wire 23;
short circuit of the power supply port 171 of the processing module 17 with the signal wire 22;
short circuit of the output port 172 of the processing module 17 with the power supply wire 21.

If the signal observed at the input port 32 of the engine control unit 30 is continuously equal to $V_L$, then the malfunction is most probably due to a short circuit of the output port 172 of the processing module 17 with the ground wire 23.

If the signal observed at the input port 32 of the engine control unit 30 transitions regularly from the potential $V_H$ to the potential $V_G$ when the target 14 is rotating, then the malfunction is most probably due to a short circuit of the output port 172 of the processing module 17 with the signal wire 22.

It is however not possible to detect a malfunction due to an open circuit of the power supply port 171 or of the output port 172 of the processing module 17. Specifically, in such a case, the signal continuously takes the value $V_H$. Because such is also the case in a normal operating scenario in which the target 14 is immobile, it is not possible to detect such a malfunction.

To overcome this problem, in a preferred embodiment of the diagnostic system 1, the processing module 17 of the sensor 10 is further configured to deliver, over the output port 172 of said processing module 17, when the target 14 is immobile, a predetermined pattern that is representative of the fact that the target 14 is immobile. For example, when the target 14 is immobile, the processing module 17 places the output port 172 of the processing module 17 in the second state (low state corresponding to the ground potential $V_G$) for 180 μs every 40 ms, the output port 172 of the processing module 17 remaining in the first (high-impedance) state for the rest of the time.

To this end, the processing module 17 includes, in a conventional manner, a set of means configured as software (processor, electronic memory, specific computer program product, etc.) and/or as hardware (FPGA, PLD, ASIC, etc.) in order to generate the pattern that is representative of the fact that the target 14 is immobile.

Figure 6:
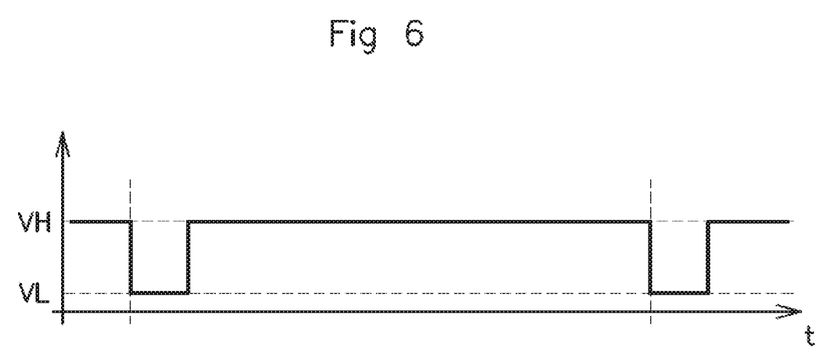
FIG. 6 shows a diagram representing, for a preferred embodiment of a diagnostic system according to an aspect of the invention, a signal observed at the input port of the engine control unit when la target of the sensor is immobile.

FIG. 6 shows the signal observed at the input port 32 of the engine control unit 30 when the target 14 is immobile for this preferred embodiment. The signal then takes a value $V_L$ for 180 μs every 40 ms, and the signal takes the value $V_H$ for the rest of the time.

Of course, this example is entirely non-limiting, and an aspect of the invention is based on sending a predetermined pattern over the output port 172 when the target 14 is immobile. The presence of this predetermined pattern makes it possible to ascertain that the sensor 10 is operating correctly.

The predetermined pattern may take various forms: in FIG. 6, it is a pulse at the value $V_L$ every 40 ms with a duration of 180 μs, the signal remaining at the value $V_H$ for the rest of the time. It is also conceivable for the predetermined pattern to take the form of a pulse pair, each pulse corresponding to a change of state of the output port 172, with a predetermined duration. The durations at the potential $V_H$ or at the potential $V_L$ differ from one another, and also differ between the two pulses of the pulse pair.

Thus, this pulse pair is noteworthy because of the predetermined durations at the potential $V_H$ and at the potential $V_L$, which differ between the two pulses, and makes it possible to quickly discern instances of the sensor 10 malfunctioning. It then becomes possible to distinguish a normal case of operation in which the target 14 is immobile from a malfunction due to an open circuit of the power supply port 171 or of the output port 172 of the processing module 17. Specifically, in a normal case of operation in which the target 14 is immobile, the signal observed that the input port 32 of the engine control unit 30 includes an atypical pulse of 180 µs at the value $V_L$ every 40 ms and remains at the value $V_H$ for the rest of the time, while in an instance of malfunction due to an open circuit of the power supply port 171 or of the output port 172 of the processing module 17, the signal remains continuously at the value $V_H$.

Additionally, it is clearly possible to identify malfunctions which are due to the sensor 10 rather than to the cable 20. For example, in the following faults cases, the signal observed at the input port 32 of the engine control unit 30 takes characteristic values that are representative of these specific cases:

open circuit of the power supply port 171 of the processing module 17 (in this case the signal remains continuously at a value $V_H$);

open circuit of the output port 172 of the processing module 17 (in this case the signal remains continuously at a value $V_H$);

short circuit of the output port 172 of the processing module 17 with the ground wire 23 (in this case the signal remains continuously at a value $V_L$);

short circuit of the output port 172 of the processing module 17 with the signal wire 22 (in this case the signal takes the value $V_G$ instead of the value $V_L$ when the target passes in front of a tooth D1 to D5).

It should be noted that even though the description has been provided on the basis of a signal of the type shown in part d) of FIG. 3, an aspect of the invention is also applicable for signals of the type shown in parts b) and c) of FIG. 3. For example, the polarity of the atypical pulse generated by the processing module 17 when the target 14 is immobile may depend on the position of the target 14 when at standstill: if the measurement cell 15 is facing a tooth D1 to D5 such that the signal continuously takes the value $V_H$, then the atypical pulse takes the value $V_L$. Conversely, if the measurement cell 15 is facing a gap such that the signal continuously takes the value $V_L$, then the atypical pulse takes the value $V_H$.

Advantageously, the period with which the atypical pulses are generated by the processing module 17 when the target 14 is immobile is chosen such that it is longer than the maximum time separating the passage of a tooth D1 to D5 from the passage of a gap of the target 14 in front of the measurement cell 15 in normal cases of operation for which the target 14 is not immobile. Additionally, the duration of the atypical pulse is chosen such that it is shorter than the minimum time separating the passage of a tooth D1 to D5 from the passage of a gap.

Figure 7:
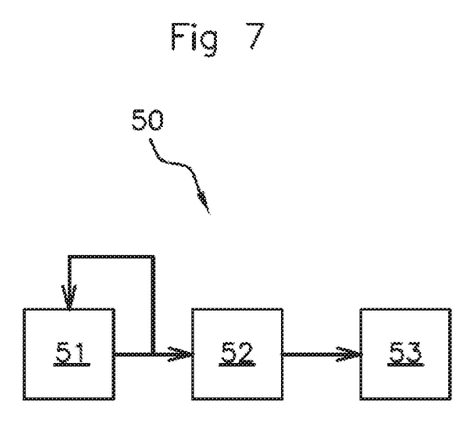
FIG. 7 is a schematic representation of the main steps of a diagnostic method implemented by a diagnostic system according to an aspect of the invention.

FIG. 7 schematically shows the main steps of a diagnostic method 50 implemented by a diagnostic system 1 according to any one of the embodiments described above. The diagnostic method 50 makes it possible to detect and to identify malfunctions due to the sensor 10 or to the cable 20.

As illustrated by FIG. 7, the diagnostic method 50 first includes a recurring step 51 of the diagnostic module 36 retrieving values taken by the signal observed on the input port 32 of the engine control unit 30. These values correspond, for example, in a conventional manner, to a sampling of the signal at a frequency that is sufficiently high with respect to a maximum frequency with which the teeth D1 to D5 pass in front of the measurement target 14 in normal cases of operation. The values are for example stored in an electronic memory of the diagnostic module 36 such that they may be processed later in the following steps of the diagnostic method 50.

The diagnostic method 50 next includes a step 52 of the diagnostic module 36 comparing the values taken by the signal with respect to predefined expected values. For example, in the preferred embodiment described with reference to FIG. 5, in normal cases of operation in which the target 14 is rotating, the signal mainly takes the value $V_H$ and exhibits typical pulses of 45 µs at the value $V_L$ when the teeth D1 to D5 pass in front of the measurement cell 15, and in normal cases of operation in which the target 14 is immobile, the signal mainly takes the value $V_H$ and exhibits atypical pulses of 180 µs every 40 ms. Thus, if the signal takes values other than the abovementioned values, for example if the signal takes the value $V_S$, $V_G$ or if it remains continuously at the value $V_H$ or $V_L$ without exhibiting atypical pulses that are characteristic of the fact that the target 14 is immobile, then there is a fault in the sensor or in the cable.

The diagnostic method 50 includes a step 53 of detecting and identifying, according to the values taken by the signal observed on the input port 32 of the engine control unit 30, a malfunction in the sensor 10 or in the cable 20. For example, in the preferred embodiment described with reference to FIG. 5, it is possible to detect a malfunction due to the sensor 10 or to the cable 20 once one of the following two conditions is met:

the signal takes a value other than $V_H$ and $V_L$;

the signal remains continuously at the value $V_H$ or $V_L$ for a duration of longer than 40 ms (i.e. without exhibiting atypical pulses that are representative of the fact that the target 14 is immobile).

Additionally, it is possible to clearly identify a fault in the sensor 10 in the following cases:

if the signal remains continuously at a value $V_H$ for a duration of longer than 40 ms (open circuit of the power supply port 171 or of the output port 172 of the processing module 17);

if the signal remains continuously at a value $V_L$ for a duration of longer than 40 ms (short circuit of the output port 172 of the processing module 17 with the ground wire 23);

if the signal takes a value $V_G$ instead of the value $V_L$ when the target passes in front of a tooth D1 to D5 (short circuit of the output port 172 of the processing module 17 with the signal wire 22).

Once a fault in the sensor 10 or in the cable 20 has been detected and/or identified, information is for example displayed on the instrument panel of the motor vehicle so as to alert the user. Alternatively, this information may be obtained by connecting a diagnostic tool such as an OBD (on-board diagnostic) unit to the engine control unit 30. By virtue of this information, a repairperson repairing the motor vehicle may improve their decision-making with regard to the repair to be carried out. In particular, they may decide to change only the cable 20 or only the sensor 10 according to the fault identified.

The description above does not take into consideration the cases of a fault in the voltage modifier circuit 18. However, it should be noted that it is possible to distinguish between cases of a fault due to the voltage modifier circuit 18 from the cases of a fault due to the cable 20. For example, in the event of a short circuit at the resistor R4, the signal observed on the input port 32 of the engine control unit 30 continuously takes the value $V_H$ and there are no atypical pulses when the target 14 is immobile. Such a situation cannot be due to a fault in the cable 20. In the event of a short circuit of the resistor R3, the signal takes an unexpected value VE during the pulses signaling that the target 14 is immobile or during the pulses corresponding to the passage of a tooth D1 to D4 of the target 14, with:

$$V_E = \frac{R4}{R2 + R4} \cdot V_S$$

Again, such a situation cannot be due to a fault in the cable 20. Specifically, in the case of a fault in the cable 20, no pulse signaling the passage of a tooth D1 to D4 or signaling that the target 14 is immobile is observed on the input port 32 of the engine control unit 30.

The description above clearly illustrates that, through its various features and the advantages thereof, an aspect of the present invention achieves the set aims. In particular, the diagnostic system 1 makes it possible, at low cost, to detect and to identify a fault in the sensor 10 or in the cable 20.

It should be noted that the implementations and embodiments considered above have been described by way of non-limiting examples, and that other variants are therefore conceivable.

In particular, although an aspect of the invention is applied particularly advantageously to the case of a crankshaft sensor 10 of a motor vehicle, it is also applicable to a transmission sensor or to a camshaft sensor. More generally still, an aspect of the invention could also be applied to other sensors which do not belong to the field of motor vehicles.

The invention claimed is:

1. A crankshaft, transmission or camshaft sensor for a motor vehicle for connection to an engine control unit of the motor vehicle, said sensor comprising:
    a toothed target,
    a measurement cell suitable for delivering a raw signal that is representative of the variations in a magnetic field that are induced by the rotation of the target, and
    a processing module suitable for placing an output port of the processing module, according to the raw signal, in a first state or in a second state, the transitions between said first state and said second state being representative of instants in time at which teeth of the target pass the measurement cell,
    an electronic voltage modifier circuit arranged between the output port of the processing module and an output port of the sensor, said voltage modifier circuit being configured to deliver, over the output port of the sensor, an output signal that is equal to a potential $V_H$ when the output port of the processing module is in the first state, and to a potential $V_L$ when the output port of the processing module is in the second state, said potentials $V_H$ and $V_L$ differing from one another and differing from a supply potential $V_S$ of the sensor and from a ground potential $V_G$,
    wherein the processing module is further configured to deliver, over the output port of said processing module, when the toothed target is immobile, a predetermined pattern that is representative of the fact that the toothed target is immobile, said predetermined pattern corresponding to a change of state of the output port of the processing module with a predetermined duration and repeated periodically.

2. The sensor as claimed in claim 1, wherein the predetermined pattern takes the form of a pulse pair, each pulse corresponding to a change of state of the output port, with a predetermined duration.

3. The sensor as claimed in claim 2, wherein the durations at the potential $V_H$ or at the potential $V_L$ differ from one another, and also differ between the two pulses of the pulse pair.

4. The sensor as claimed in claim 1, wherein the voltage modifier circuit includes a resistor placed between a power supply port of the sensor and the output port of the sensor, a resistor placed between an output port of the processing module and the output port of the sensor, and a resistor placed between a ground port of the sensor and the output port of the sensor.

5. The sensor as claimed in claim 1, wherein the electronic voltage modifier circuit includes only passive discrete electronic components.

6. A diagnostic system comprising:
    a sensor as claimed claim 1;
    an electrical cable including a power supply wire, a ground wire and a signal wire; and
    an engine control unit connected to the sensor by the cable and including:
        a power supply port connected to a power supply port of the sensor by the power supply wire;
        a ground port connected to a ground port of the sensor by the ground wire;
        an input port connected to the output port of the sensor by the signal wire; and
        a diagnostic module connected to said input port, said diagnostic module being configured to detect and to identify, according to a signal observed on the input port of the engine control unit, a fault in the sensor or a fault in the cable.

7. The system as claimed in claim 6, wherein the input port is also connected to a pull-down resistor which is connected to a ground line of the engine control unit.

8. A motor vehicle including a system as claimed in claim 6.

9. A diagnostic method implemented by a system as claimed in claim 6, comprising:
    a recurring step of the diagnostic module retrieving values taken by the signal observed on the input port of the engine control unit;
    a step of the diagnostic module comparing the values taken by said observed signal with respect to predefined expected values;
    a step of the diagnostic module detecting and identifying, according to the differences between the values taken by said observed signal and the predefined expected values, a fault in the sensor or a fault in the cable.

10. A diagnostic method implemented by a system as claimed in claim 7, comprising:
    a recurring step of the diagnostic module retrieving values taken by the signal observed on the input port of the engine control unit;
    a step of the diagnostic module comparing the values taken by said observed signal with respect to predefined expected values;
    a step of the diagnostic module detecting and identifying, according to the differences between the values taken by said observed signal and the predefined expected values, a fault in the sensor or a fault in the cable.

11. A motor vehicle including a system as claimed in claim 7.

* * * * *